Feb. 5, 1929.   1,701,145
C. J. COBERLY
PROCESS OF CUTTING KEYSTONE SHAPED SLOTS
Filed Sept. 29, 1923
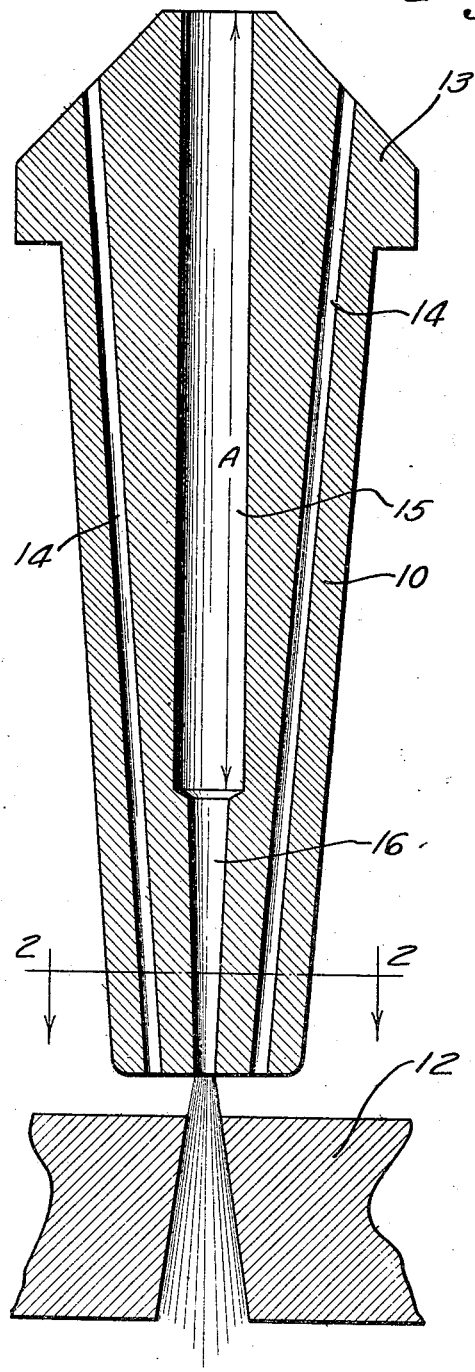
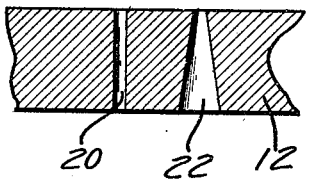
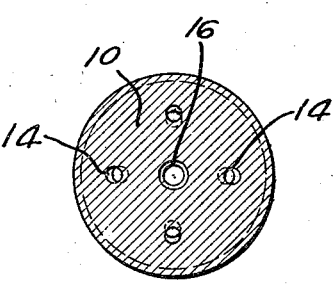
INVENTOR
Clarence J. Coberly
By
Graham + Ranier
ATTORNEYS Patented Feb. 5, 1929.

1,701,145

UNITED STATES PATENT OFFICE.

CLARENCE J. COBERLY, OF LOS ANGELES, CALIFORNIA, ASSIGNOR, BY MESNE ASSIGNMENTS, TO PUROX COMPANY, OF DENVER, COLORADO, A CORPORATION OF COLORADO.

PROCESS OF CUTTING KEYSTONE-SHAPED SLOTS.

Application filed September 29, 1923. Serial No. 665,646.

My invention relates to the art of cutting slots in metal plates, and more particularly to the art of cutting slots in oil well casing.

In the production of oil, it is generally necessary to provide a steel casing or pipe which extends from the surface of the earth down into the oil sands and which is perforated where it extends into the oil sands with slots sufficiently narrow to hold back the coarse sand and gravel surrounding the pipe, while at the same time permitting the oil to flow therethrough.

I have found that slots suitable for this purpose can be economically produced by a cutting torch, using a high temperature flame and a jet of substantially pure oxygen. It is highly desirable to produce slots having a keystone-shaped section, that is to say it is desirable to produce slots of uniform width at the outer surface of the pipe, which slots are wider at the inner surface of the pipe, it having been found that slots having this shape are much less likely to clog up in the operation of the well.

My invention provides a ready means for economically cutting slots of this peculiar form in the casing before it is put in the well.

Referring to the drawing which is for illustrative purposes only,

Fig. 1 is a cross section through a cutting tip adapted to carry out my invention, this cutting tip being shown in position with relation to the material to be cut and the slot to be formed.

Fig. 2 is a section on a plane represented by the line 2—2 of Fig. 1.

Fig. 3 is a diagram showing the variations in form of slot produced by a variation in oxygen pressure.

In the form of the invention shown, 10 is a cutting tip shown in operation in connection with material 12. This tip is provided with a conical head 13 adapted to be seated in a torch and is provided with heating flame orifices 14 which are preferably supplied with a mixture of oxygen and some combustible gas from the torch. A central orifice 15 is provided which is supplied with oxygen from the torch. The method of securing such tips in a cutting torch and supplying them with the mixed gas and oxygen, being old in the art, need not be further illustrated or shown here.

The oxygen orifice 15 may be counterbored to a uniform diameter for the distance represented by the dimension "A." Extending downwardly from this counterbored portion is a tapered cutting orifice 16, which in the standard form of cutting torch is preferably about .060 of an inch in diameter at its point of juncture with the counterbore and .040 of an inch in diameter at the lower end of the tip. The heating orifices 14 are of uniform diameter, being preferably .028 of an inch in diameter.

In the operation of the invention the tip is used in the ordinary manner, the heating jets from the orifices 14 being used to heat the material to a point where the cutting jet from the orifice 16 becomes effective. The tapering of the orifice 16 tends to spread the cutting jet into a conical shape as it leaves the orifice. Using the standard form of cutting torch and utilizing standard tip cutting plates ½ inch in thickness, the standard pressure of oxygen would be 18 pounds per square inch. When operating in this manner, the standard cutting torch will cut a slot which has substantially parallel sides, as shown at 20 in Fig. 3.

In the cutting of slots in well casing, it is desirable to have the form shown at 22 in Fig. 3, and this form I produce partly by tapering the orifice 16 and partly by using an operating pressure of 60 pounds per square inch in the orifice 15. By combining the tapered orifice and the excess pressure, a spreading cutting jet is produced which is substantially conoidal in form and which may be utilized to produce a slot of the general form shown in Fig. 1 and at 22 in Fig. 3.

The spreading or tapering of the cutting jet may be varied by changing the pressure of the oxygen. If the pressure is increased the taper of the cutting jet will be increased, and if the pressure is decreased the taper of the cutting jet will be decreased.

As explained above, such a keystone-shaped slot has a special utility in oil well casing as it holds back the formations without itself becoming clogged by the sand or gravel carried by the oil.

I claim as my invention:

1. A process of cutting keystone slots in metal comprising: heating said metal by suitable heating jets; forming a stream of cutting gas into a tapering cutting jet; and directing said tapering cutting jet through the metal to be provided with keystone slots.

2. A process of cutting keystone slots in metal comprising: heating said metal by suitable heating jets; forming a stream of cutting gas, said stream being under high pressure; constricting said stream so that when said stream is released it will constitute a tapering cutting jet; and directing said tapering cutting jet through the metal to be provided with keystone slots.

3. A process of cutting keystone slots in metal comprising: heating said metal by suitable heating jets; forming a stream of cutting gas into a tapering cutting jet; varying the pressure of said stream of cutting gas in order to vary the taper of said cutting jet; and directing said tapering cutting jet through the metal to be provided with keystone slots.

4. A process of cutting keystone slots in metal comprising: heating said metal by suitable heating jets; forming a stream of cutting gas, said stream being under high pressure; constricting said stream so that when said stream is released it will constitute a tapering cutting jet; varying the pressure of said stream of cutting gas in order to vary the taper of said cutting jet; and directing said tapering cutting jet through the metal to be provided with keystone slots.

In testimony whereof, I have hereunto set my hand at Los Angeles, California, this 20th day of September, 1923.

CLARENCE J. COBERLY.